(12) United States Patent
Treynor (10) Patent No.: US 7,143,061 B2
(45) Date of Patent: Nov. 28, 2006

(54) METHOD FOR MAINTAINING AN ABSOLUTE RISK LEVEL FOR AN INVESTMENT PORTFOLIO

(76) Inventor: Jack Lawrence Treynor, 504 Via Almar, Palos Verdes Estates, CA (US) 90274

(*) Notice: Subject to any disclaimer, the term of this patent is extended or adjusted under 35 U.S.C. 154(b) by 44 days.

(21) Appl. No.: 10/389,667

(22) Filed: Mar. 14, 2003

(65) Prior Publication Data
US 2004/0199447 A1 Oct. 7, 2004

(51) Int. Cl.
*G06Q 40/00* (2006.01)
(52) U.S. Cl. .......................... 705/36 R; 705/35; 705/37
(58) Field of Classification Search ................ 705/35, 705/36, 37
See application file for complete search history.

(56) References Cited

U.S. PATENT DOCUMENTS

| | | | |
|---|---|---|---|
| 5,126,936 A | 6/1992 | Champion et al. | |
| 5,262,942 A | 11/1993 | Earle | |
| 5,761,442 A | 6/1998 | Barr et al. | |
| 5,799,287 A | 8/1998 | Dembo | |
| 5,812,987 A | 9/1998 | Luskin et al. | |
| 5,812,988 A | 9/1998 | Sandretto | |
| 5,819,238 A * | 10/1998 | Fernholz | 705/36 |
| 6,029,148 A | 2/2000 | Zurstrassen | |
| 6,175,824 B1 | 1/2001 | Breitzman et al. | |
| 6,275,814 B1 | 8/2001 | Giansante et al. | |
| 6,278,983 B1 | 8/2001 | Ball | |
| 6,292,787 B1 | 9/2001 | Scott et al. | |
| 6,832,209 B1 * | 12/2004 | Karp et al. | 705/36 T |
| 2002/0038273 A1 * | 3/2002 | Wherry et al. | 705/36 |
| 2002/0077946 A1 | 6/2002 | Caplan et al. | |
| 2003/0004846 A1 * | 1/2003 | Schneider | 705/36 |
| 2003/0115128 A1 * | 6/2003 | Lange et al. | 705/37 |
| 2004/0024695 A1 * | 2/2004 | Melamed | 705/38 |

OTHER PUBLICATIONS

Berenguer, Maria et al.; Credit Risk: Modelling to manage, Balace Sheet v7n1 pp. 37-41, Dec. 1998.*
Karen Hube 'Market-Neutral' Mutual Funds Are Attracting Some Small Investors Wanting to Minimize Risk, Wall Street Journa (Eastern edition). New York, N.Y.: May 13, 1998.*
International Search Report dated Jan. 6, 2005.
Investments, Second Edition, About The Authors, Zvi Bodie, Alex Kane, Alan J. Marcus, 3 pgs., Perspectives Thoughts on the Future: Life-Cycle Investing in Theory and Practice, Jan./Feb. 2003, AIMR, pp. 24-29.

* cited by examiner

*Primary Examiner*—Jagdish N Patel
(74) *Attorney, Agent, or Firm*—Pearl Cohen Zedek Latzer, LLP (57) ABSTRACT

The present invention provides for maintaining an approximate absolute risk level for an investment portfolio while minimizing trading necessary to do so. A portfolio of long and short position assets can be obtained that is approximately logarithmic, in the sense that that the value of the portfolio varies in constant proportion to a fractional change in a level of a market. When the market level changes by a specified degree, asset holdings can be adjusted as necessary to the maintain the portfolio as being approximately logarithmic, and total holdings can be adjusted as necessary to maintain a specified level of absolute risk.

12 Claims, 7 Drawing Sheets

Fig. 6
600    Approximation errors

| x/a | x | σ/dx | dy/dx | σ/dy | %error |
|---|---|---|---|---|---|
| 1.30 | 1.30a | 0.26a | 0.70/a | 0.1820 | 9.00 |
| 1.25 | 1.25a | 0.25a | 0.75/a | 0.1875 | 6.25 |
| 1.20 | 1.2a | 0.24a | 0.80/a | 0.1920 | 4.00? |
| 1.15 | 1.15a | 0.23a | 0.85/a | 0.1955 | 2.25 |
| 1.10 | 1.10a | 0.22a | 0.90/a | 0.1980 | 1.00 |
| 1.05 | 1.05a | 0.21a | 0.95/a | 0.1995 | 0.25 |
| 1.00 | 1.00a | 0.20a | 1/a | 0.20 | 0.00 |
| 0.95 | 0.95a | 0.19a | 1.05/a | 0.1995 | 0.25 |
| 0.90 | 0.90a | 0.18a | 1.10/a | 0.1980 | 1.00 |
| 0.85 | 0.85a | 0.17a | 1.15/a | 0.1955 | 2.25 |
| 0.80 | 0.80a | 0.16a | 1.20/a | 0.1920 | 4.00 |
| 0.75 | 0.75a | 0.15a | 1.25/a | 0.1875 | 6.25 |
| 0.70 | 0.70a | 0.14a | 1.30/a | 0.1820 | 9.00 |

End-of-Year Values for Rebalancing Years

Fig. 7    700

Table

| Year | US mkt index | End of Year Values for Rebalancing Years |
|------|--------------|------------------------------------------|
| 1977 | 169 | |
| 1979 | 179 | $178/169 = 1.0592^2 = 1.1218$ |
| 1980 | 210 | |
| 1981 | 225 | $225/210 = 1.0714^2 = 1.1479$ |
| 1982 | | |
| 1983 | 281 | $281/210 = 1.3381^2 = 1.7905$ |
| 1986 | 409 | |
| 1987 | 516 | $516/409 = 1.2616^2 = 1.5917$ |
| 1989 | 577 | |
| 1990 | 609 | $609/577 = 1.0554^2 = 1.1140$ |
| 1991 | 695 | |
| 1992 | 765 | $765/695 = 1.1007^2 = 1.2116$ |
| 1993 | 806 | |
| 1994 | 841 | $841/806 = 1.0434^2 = 1.0887$ |
| 1995 | 1000 | |
| 1996 | 1235 | $1235/1000 = 1.2350^2 = 1.5252$ |
| 1997 | 1595 | |
| 1998 | 1987 | $1987/1593 = 1.2473^2 = 1.5558$ |
| 1999 | | |
| 1999 | 2513 | $2513/1987 = 1.2647^2 = 1.5995$ |
| | | |
| 2000 | | $2728/2513 = 1.0856^2 = 1.1784$ | end-of-year current/beginning ratios long position   short position new  line  two  values  in  the worksheet after market level change during balancing year

METHOD FOR MAINTAINING AN ABSOLUTE RISK LEVEL FOR AN INVESTMENT PORTFOLIO

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention generally relates to investment methods and, more particularly, to a method for maintaining an absolute risk level for an investment portfolio.

BACKGROUND OF THE INVENTION

Investors have become increasingly interested in controlling the risk associated with investment portfolios, risk being characterized by an anticipated likely rate of change in the value of the portfolio. Mutual funds, for instance, allow investors to control or minimize risk through diversified asset holdings. Overlooked, however, is the important principle of maintaining a certain level of dollar risk, or absolute risk, over time. Relative risk, or percentage risk, in the stock market, which is characterized by dollar gain or loss divided by initial dollar investment, tends to be fairly constant over long periods of time. Absolute risk, or dollar risk, by contrast, is characterized simply by dollar risk over time.

If an investor simply buys and holds assets in a portfolio, the absolute risk associated with the portfolio will change over time, as the level of the market changes over time. If the market increases, the absolute risk increases, and vice versa. In a sense, the investor is allowing his future bet to be determined by the results of his last bet. Over time, the effect of this skewing of absolute risk is magnified and very significant.

It would be desirable to be able to maintain a portfolio that is time diversified, in the sense that the absolute risk associated with the portfolio stays approximately constant over time. Furthermore, it would be desirable to do so with minimal trading, so as to incur a minimal expense, difficulty, or inconvenience associated with the trading.

The old view of diversification was well expressed in the adage, "don't put all your eggs in one basket." The modem view advises instead, "don't put your eggs in correlated baskets." The modem model for diversification, or for overcoming uncertainty, is the mean of a random variable. If the drawings from the variable's frequency distribution are random, then the "standard deviation" of the sample mean varies inversely with the square root of the size of the sample.

The return to the investor's portfolio is a weighted mean of returns to individual investments. But the analogy with the sample mean fails if the individual investment values go up and down together. If individual stocks weren't correlated, there would be little uncertainty about the future value of the S&P 500, or of many mutual funds. If, on the other hand, individual stocks were perfectly correlated, there would be little point in owning such funds.

Because returns on individual stock are correlated, albeit imperfectly, the square-root law doesn't apply. Indeed, there's a limit to how much risk a mutual fund can eliminate. Market returns in different years are generally uncorrelated; if they weren't, investors would use past returns to profitably predict future returns.

For the buy-and-hold investor, the scale of next year's bet is determined by the outcome of last year's bet. In their impact on his "terminal wealth," which can be, for example, wealth at retirement or some other target point, the individual years multiply. So the additive model of the sample mean doesn't apply.

Yet the fact remains that the investor's terminal wealth is the (algebraic) sum of the gains and losses in the individual year. If, as many finance scholars believe, the risk surrounding the market's rate of return is roughly constant across time ("stationary") then, when the market level doubles, the risk of dollar gains and losses also doubles.

Unless an investor is rash enough to think he can distinguish beforehand between the good market years and the bad, the investor may want each year to have the same potential dollar impact on his terminal wealth. When the market level doubles, time diversification will require that he sell half his stock portfolio, etc. maintaining constant dollar risk entails a lot of expensive trading. The conventional investor is faced with a dilemma: either incur those draconian trading costs, or give up the benefits of time diversification, as buy-and-hold investors do.

Therefore, there is a need for a method for a method for maintaining an absolute risk level for an investment portfolio while minimizing trading necessary to maintain the absolute risk level.

SUMMARY OF THE INVENTION

The present invention provides methods for maintaining absolute risk level for an investment portfolio. In some embodiments, the invention provides methods for maintaining absolute risk level, or an approximate absolute risk level, for an investment portfolio while minimizing trading necessary to do so. A portfolio of assets can be obtained that is approximately logarithmic, in the sense that that the value of the portfolio varies in constant proportion to the fractional change in the level of the market, constant proportion meaning that a constant of proportionality associated with the proportion remains constant even as market level varies.

In some embodiments, the logarithmic portfolio can be obtained by obtaining assets approximately in accordance with the terms of a simplified Taylor Series expansion of a logarithm function, such as, for example, the natural logarithm function. It is to be understood that, although the invention is described herein primarily with reference to the natural logarithm function, the principles of the invention can also be demonstrated with any logarithm function, or a logarithm with any base.

The assets can be obtained such that a beta one asset, which is an asset whose value varies linearly in proportion with the level of the market, is used in a first order term, while a beta two asset, which is an asset whose value varies in proportion to the square of the level of the market, is used in a second order term. A long holding or long holdings can be used to satisfy the positive first order term, while short holdings, or short position holdings, can be used to satisfy the negative second order term.

In some embodiments, a portfolio is obtained that is approximately logarithmic and has a specified approximate level of absolute risk. When the market level increases or decreases to a specified degree, asset holdings can be adjusted to maintain the portfolio as being approximately logarithmic, and a total holdings level can be adjusted to maintain the specified approximate absolute risk. Total holdings can be adjusted downward when the market level increases, and upward when the market level decreases, to maintain the specified level of absolute risk.

In one embodiment, the invention provides a method for investing in a stock market. The method includes: allocating funds to be invested among at least: a first portfolio wherein a buy position is taken and a second portfolio wherein a short position is taken; tracking a measure of a level of the stock market to determine when successive rebalancing times are indicated; and adjusting fund amounts allocated to the first and second portfolios at the successive rebalancing times to maintain an approximately constant absolute risk in connection with the portfolios.

In another embodiment, the invention provides a computer program product for assisting in investing in a stock market, comprising a computer usable medium having computer readable code embodied therein. The computer readable code, when executed causing a computer to: allocate funds to be invested among at least: a first portfolio wherein a buy position is taken and a second portfolio wherein a short position is taken; track a measure of a level of the stock market to determine when successive rebalancing times are indicated; and adjust fund amounts allocated to the first and second portfolios at the successive rebalancing times to maintain an approximately constant absolute risk in connection with the portfolios.

In another embodiment, the invention provides a method for investing funds in a stock market, comprising: allocating the funds among at least: (a) a first portfolio having a risk measure that indicates its performance substantially tracks a measure of a level of the stock market and (b) a second portfolio having a risk measure that is substantially greater than the risk measure of the first portfolio. The method further includes taking a buy position in the first portfolio and a short position in the second portfolio; tracking the measure of the level of the stock market to determine when successive rebalancing times are indicated; the successive rebalancing times being indicated when a value of the measure at a first rebalancing time has changed relative to a previous value thereof at a second rebalancing time by a trigger percentage level; and adjusting fund amounts allocated to the at least first and second portfolios at the successive rebalancing times by: (a) decreasing the buy position by a first percentage and increasing the short position by a second percentage when the value of the measure at the first rebalancing time has increased relative to the previous value; and (b) increasing the buy position by the first percentage and decreasing the short position by the second percentage when the value of the measure at the first rebalancing time has decreased relative to the previous value.

In another embodiment, the invention provides a computer program product for assisting in investing in a stock market, comprising a computer usable medium having computer readable code embodied therein. When executed on a computer, the computer readable code causes a computer to: allocate funds to be invested among at least: a first portfolio in which a buy position is taken and a second portfolio in which a short position is taken, and in which the first portfolio has a value that changes substantially linearly with change in a level of a stock market, and in which the second portfolio has a value that changes substantially with the square of change in the level of the stock market; track a measure of a level of the stock market to determine when successive rebalancing times are indicated; and adjust fund amounts allocated to the first and second portfolios at the successive rebalancing times to maintain an approximately constant absolute risk in connection with the portfolios by: (a) decreasing the buy position by a first percentage and increasing the short position by a second percentage when the value of the measure at a first rebalancing time has increased relative to a previous value; and (b) increasing the buy position by the first percentage and decreasing the short position by the second percentage when the value of the measure at the first rebalancing time has decreased relative to the previous value.

In another embodiment, the invention provides a method for managing an investment portfolio. The method includes allocating assets in the portfolio to achieve a first risk measure in the portfolio which is substantially proportional to a logarithm of a second risk measure of a market in which the assets are invested, in which the assets are allocated so that the value of the portfolio is anticipated to change over time approximately in constant proportion to the fractional change in market level over time, and in which the assets are determined to obtain a specified approximate level of absolute risk. The method further includes, when the market level is determined to have changed to a specified degree, adjusting asset allocations as necessary to maintain the portfolio as being approximately logarithmic and to maintain the specified approximate level of absolute risk.

In another embodiment, the invention provides a method for managing an investment portfolio. The method includes allocating assets in the portfolio to achieve a measure of anticipated change in the value of the portfolio which is substantially proportional to a logarithm of a measure of an anticipated fractional change in a level of a market in which the assets are invested, in which the assets are allocated so that the value of the portfolio is anticipated to change over time approximately in constant proportion to the fractional change in market level over time, and in which the assets are determined to obtain a specified approximate level of absolute risk. The method further includes, when the market level is determined to have changed to a specified degree, adjusting asset allocations as necessary to maintain the portfolio as being approximately logarithmic and to maintain the specified approximate level of absolute risk.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In some embodiments, the present invention provides for maintaining an approximate absolute risk level for an investment portfolio while minimizing trading necessary to do so. A portfolio which can include long and short position assets can be obtained that is approximately logarithmic, in the sense that that the value of the portfolio varies in constant proportion to a fractional change in a level of a market, constant proportion meaning that a constant of proportionality associated with the proportion remains constant even as market level varies.

When the market level changes by a specified degree, asset holdings can be adjusted as necessary to the maintain the portfolio as being approximately logarithmic, and total holdings can be adjusted as necessary to maintain a specified level of absolute risk The present invention provides methods for maintaining absolute risk level for an investment portfolio. In some embodiments, the invention provides methods for maintaining absolute risk level, or an approximate absolute risk level, for an investment portfolio while minimizing trading necessary to do so. A portfolio of assets can be obtained that is approximately logarithmic, in the sense that that the value of the portfolio varies in constant proportion to the fractional change in the level of the market, constant proportion meaning that a constant of proportionality associated with the proportion remains constant even as market level varies.

In some embodiments, the logarithmic portfolio can be obtained by obtaining assets approximately in accordance with the terms of a simplified Taylor Series expansion of the natural logarithm. The assets can be obtained such that a beta one asset, which is an asset whose value varies linearly in proportion with the level of the market, is used in a first order term, while a beta two asset, which is an asset whose value varies in proportion to the square of the level of the market, is used in a second order term. A long holding or long holdings can be used to satisfy the positive first order term, while short holdings, or short position holdings, can be used to satisfy the negative second order term.

In some embodiments, a portfolio is obtained that is approximately logarithmic and has a specified approximate level of absolute risk. When the market level increases or decreases to a specified degree, asset holdings can be adjusted to maintain the portfolio as being approximately logarithmic, and a total holdings level can be adjusted to maintain the specified approximate absolute risk. Total holdings can be adjusted downward when the market level increases, and upward when the market level decreases, to maintain the specified level of absolute risk.

Embodiments of the present invention can be used with various markets and assets, and various indicators, indices, averages, or other ways or ways to measure changes in the market. Examples of measures that can be used in tracking stock market levels include the S & P 500, the NASDAQ Composite Index, the Dow Jones Industrial Average, etc.

Figure 1:
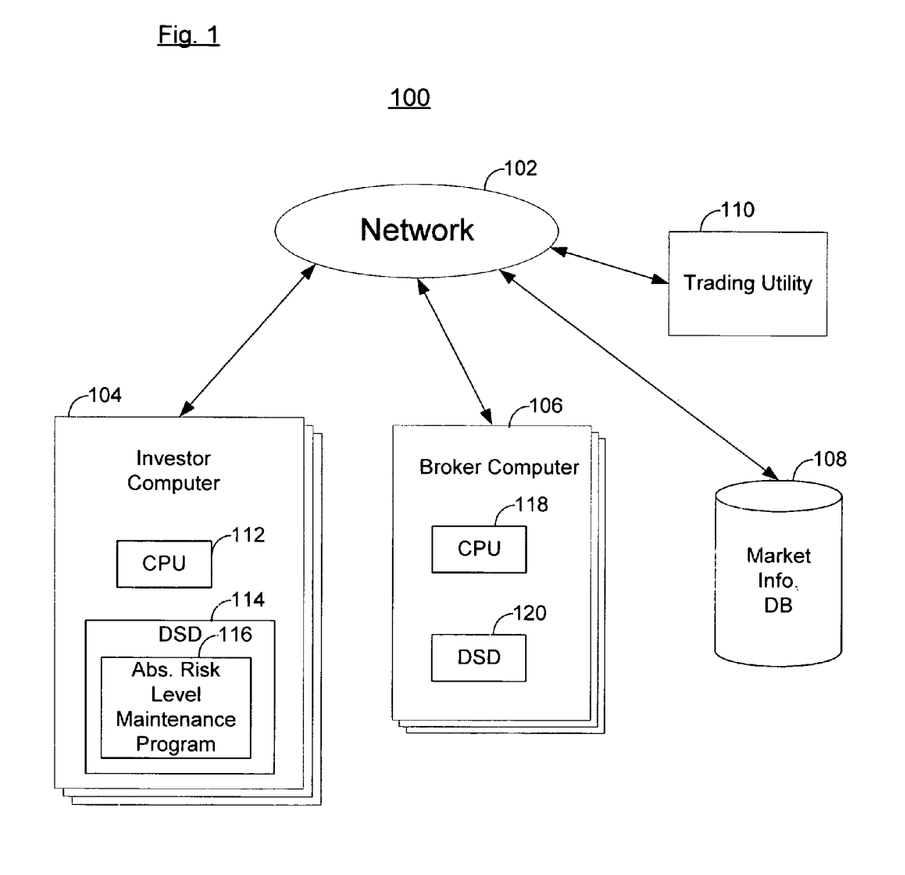
FIG. 1 is a block diagram depicting one embodiment of a networked computer system that can be used to carry out a method according to the invention.

FIG. 1 is a networked computer system 100 that can be used to practice some embodiments of the invention. It is to be understood, however, that, in some embodiments, the invention can be practiced using only a single computer, or even by hand. For example, in some embodiments, the invention can include simply a computer including an absolute risk level maintenance program as described herein, the computer being trade-enabled and having access to market data.

As depicted in FIG. 1, the system 100 includes one or more networks 102, one or more investor computers 104, one or more broker computers 106, one or more market information databases, and one or more trading utilities. The network 102 can include a broad array of networks including local area networks, wide area networks, personal area networks, secure networks, or the Internet. Each of the computers 104, 106 includes one or more central processing units (CPUs) 112, 118 and one or more data storage devices 114, 120 which, in come embodiments, can include one or more Internet browser programs or other network browser programs. The data storage devices 112, 118 as well as the market information database 108 can comprise various amounts of RAM for storing computer programs and other data. In addition, the computers 104, 106 can include other components typically found in or associated with computers, such as one or more hard disk drives, floppy disk drives, CD-ROM drives, and one or more input devices such as mouse pointing devices, keyboards, or styluses. The computers 104, 106 can be, for example desktop computers, notebook computers, hand-held computers, cell phone or wireless Internet access enabled computers.

Generally, the computer programs of the present invention are tangibly embodied in a computer-readable medium, e.g., one or more data storage devices attached to a computer. Under the control of an operating system, computer programs may be loaded from data storage devices into computer RAM for subsequent execution by the CPU. The computer programs comprise instructions which, when read and executed by the computer, cause the computer to perform the steps necessary to execute elements of the present invention.

The trading utility 110 can be any means accessible via the network 102 though which a trader, such as a user of the investor computer 104 or the broker computer, can execute trades, such as, for example, trades associated with buying or selling of assets in connection with a stock market such as the New York Stock Exchange.

As depicted in FIG. 1, the investor computer includes an absolute risk level maintenance program 166. The absolute risk level maintenance program 166 broadly represents any and all programming, applications, software, or other tools necessary to implement the methods according to the invention, as described herein.

Figure 2:
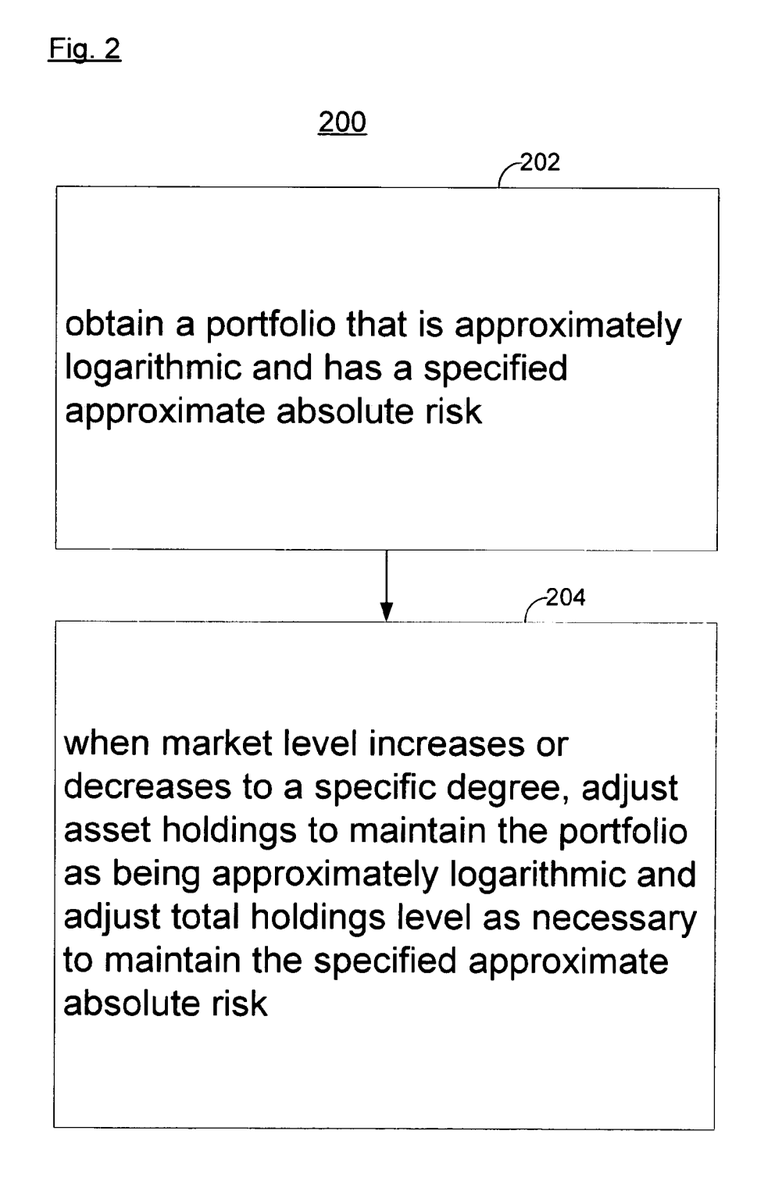
FIG. 2 is a flow diagram depicting a method according to one embodiment of the invention.
Figure 3:
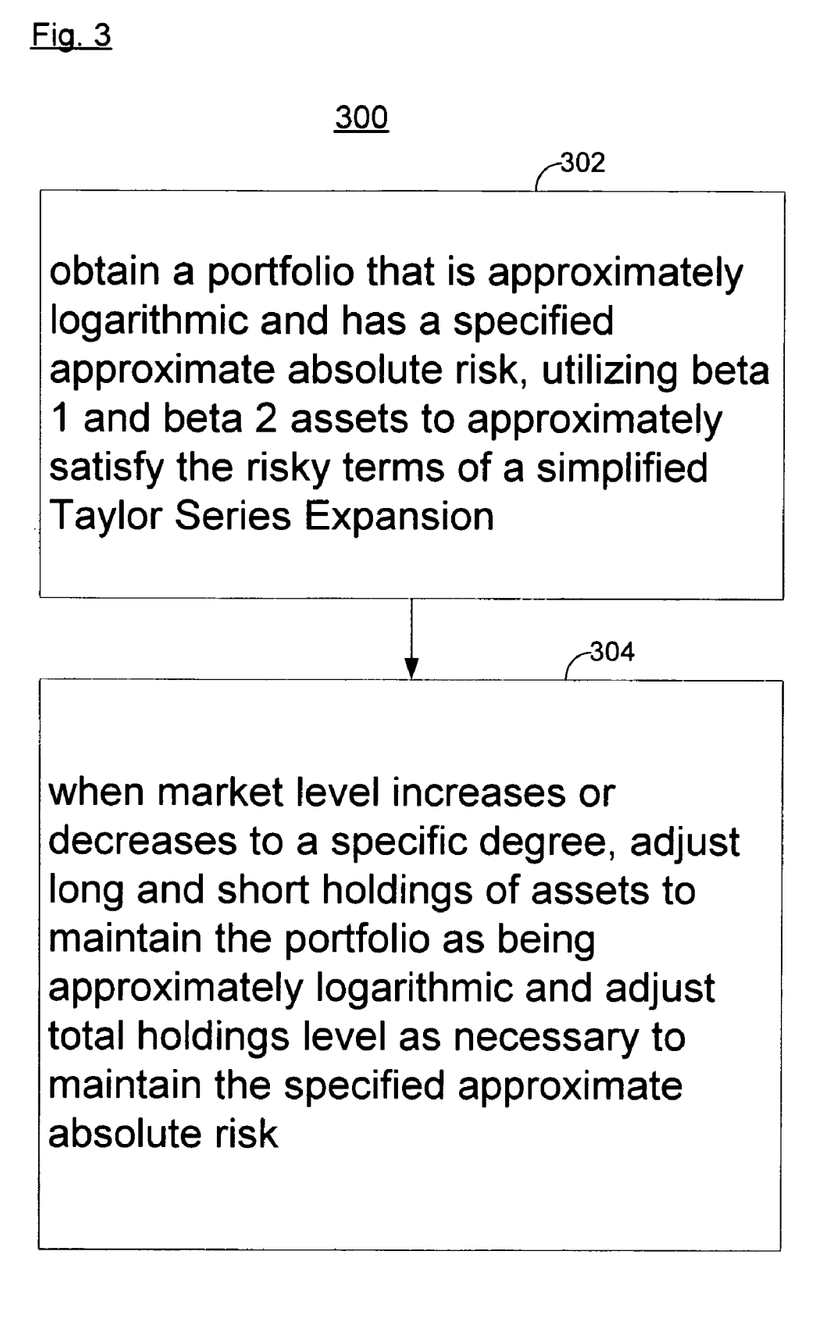
FIG. 3 is a flow diagram depicts one embodiment of the method depicted in FIG. 2.
Figure 4:
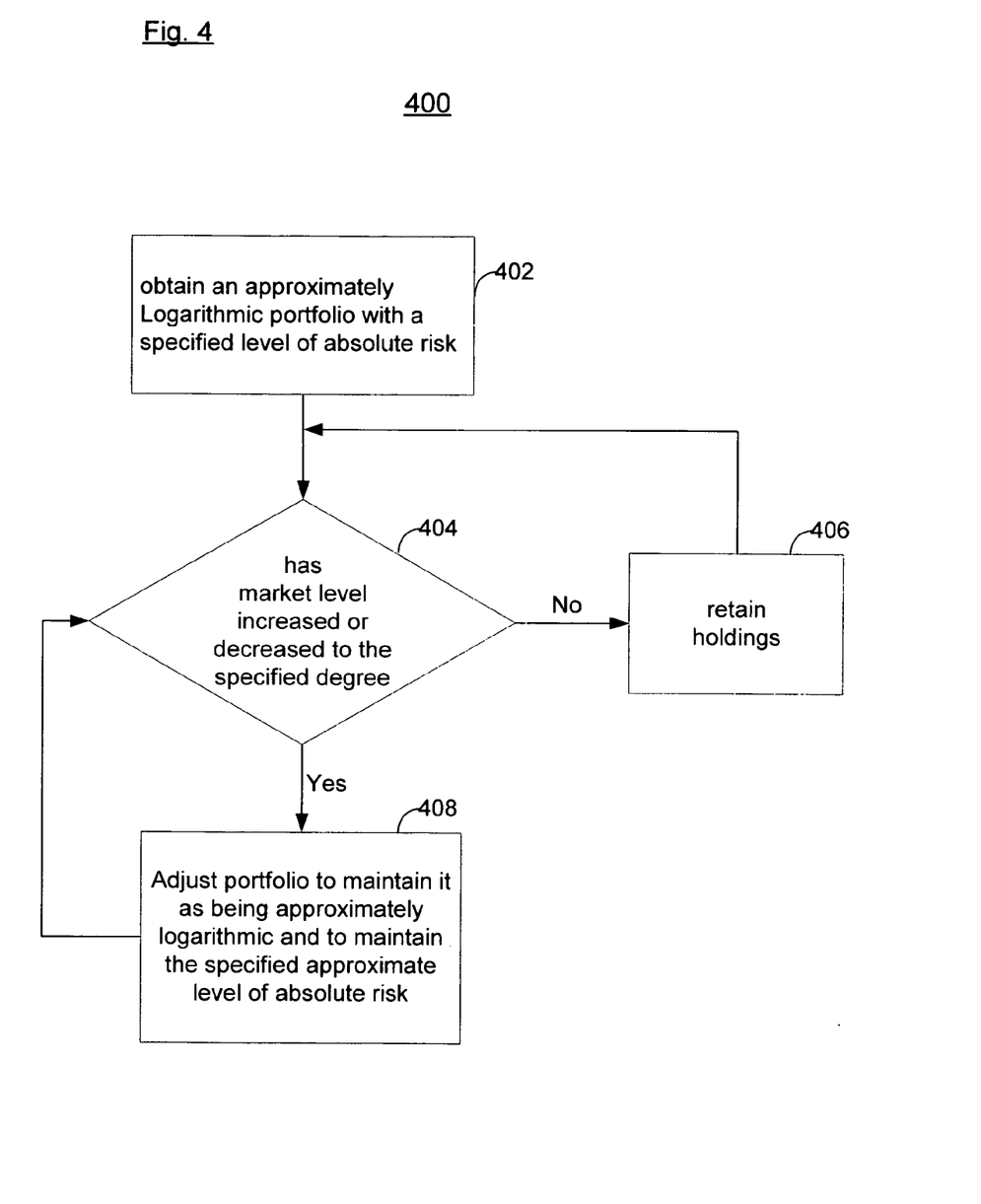
FIG. 4 is a flow diagram depicted a method according to one embodiment of the invention.

FIGS. 2–4 depict methods according to some embodiments of the invention. Additional details regarding some steps, aspects or elements of the methods are provided after a overall description of the steps of the methods depicted in FIGS. 2–4.

FIG. 2 is a flow diagram depicting a method 200 according to one embodiment of the invention. The method 200 can be implemented, for example, using the absolute risk level maintenance program 116 as depicted in FIG. 1. At step 202, a portfolio of investment assets is obtained that is approximately logarithmic, in the sense that that the value of the portfolio, taken as a whole, varies in constant proportion to the fractional change in the level of the market.

At step 204, when a level of a market changes, that is, increases or decreases, to a specified degree, asset holdings of the portfolio are adjusted as necessary to maintain the specified approximate absolute risk level. In some embodiments, for example, a re-portfolio as being approximately logarithmic, and total holdings are adjusted as necessary to maintain the balancing of assets and total holdings is performed when or after a measure of the level of the market indicates that the level has increased or decreased to a specified degree.

Logarithmic portfolios can have advantages over conventional, non-logarithmic portfolios. At a point in time, the change in the value of a conventional portfolio is proportional to the fractional change in the market, but the factor of proportionality depends on the market level. However, for a logarithmic portfolio, that the factor is the same for all market levels As such, logarithmic portfolios have the following special property: a given fractional change in the market always produces the same "absolute" dollar change in the portfolio's value, irrespective of the market level. If the risk surrounding fractional changes in, the stock market, or rates of return on the stock market, is constant across time, then the risk surrounding the corresponding dollar changes in this portfolio's value will also be constant across time.

Logarithmic portfolios have constant dollar risk, and their value varies with the logarithm of the stock market level. If there were actual common stocks, or portfolios of stocks, with this logarithmic property, constant dollar risk could be mainainted without the need to ever offset the effect of market fluctuations with trading.

FIG. 3 is a flow diagram depicts one embodiment of the method 200 depicted in FIG. 2. The method 300 can be implemented, for example, using the absolute risk level maintenance program 116 as depicted in FIG. 1. At step 302, a portfolio of investment assets is obtained that is approximately logarithmic, in the sense that that the value of the portfolio, taken as a whole, varies in constant proportion to the fractional change in the level of the market, utilizing beta one and beta two assets to approximately satisfy the terms of a simplified Taylor Series expansion of the associated natural logarithm function.

FIG. 4 is a flow diagram depicting a method 400 according to one embodiment of the invention. The method 400 can be implemented, for example, using the absolute risk level maintenance program 116 as depicted in FIG. 1. At step 402, an approximately logarithmic portfolio, such as, for example, described with reference to FIG. 2, is obtained. At step 404, the method 400 inquires whether market level has changed to a specified degree, for example, as determined by some measure of the market level, such as, in some embodiments, the Dow Jones Industrial Average.

If the answer at step 404 is negative, then the method 400 proceeds to step 406. At step 406, the holdings of the portfolio are retained.

If the answer at step 404 is positive, then the method 400 proceeds to step 408. At step 408, the portfolio is adjusted to maintain it as being approximately logarithmic and to maintain a specified approximate level of absolute risk.

As discussed, in some embodiments of the invention, an approximately logarithmic portfolio is obtained, such a portfolio being one in which the value of the portfolio varies in proportion to the fractional change in the level of the market. Mathematically, this can be expressed in the equation:

$$y = \log x \quad (1)$$

in which:
x=the level of the market
y=the value of the portfolio

It is to be noted that herein, unless otherwise stated, "log" means natural logarithm, or ln. Taking a derivative with respect to x yields:

$$dy/dx = 1/x \quad (2)$$

Transposing yields:

$$dy = dx/x \quad (3)$$

According to Equation (3), the instantaneous change in the value of the portfolio, dy, is equal to the instantaneous change the fractional level of the market, dx/x. This relationship is characteristic of a logarithmic portfolio.

One would be hard-pressed, however, to find a single investment asset that has this logarithmic quality. Mathematically, a Taylor Expansion series, as known in the art, can be used to approximate the natural logarithm function. Using a Taylor series to model a logarithmic asset or portfolio yields:

$$\log x/a = \sim[(x-a)/a] - \tfrac{1}{2}\{[(x-a)/a]\}^2 + \tfrac{1}{3}\{[(x-a)/a]\}^3 - \tfrac{1}{4}\{[(x-a)/a]\}^4 \quad (4)$$

in which:
x=current market level
a=initial market level

Collecting terms and simplifying, or approximating, yields:

$$\log (x/a) = \sim 2 (x/a) - \tfrac{1}{2}(x/a)^2 - \tfrac{3}{2} \quad (5)$$

Equation (5) can be used to choose assets to create an approximately logarithmic portfolio. Specifically, to satisfy the first order term (x/a), a long position, to model the positive sign, of an asset that varies, or is anticipated to vary, approximately linearly with the square of the market level can be used. This is called a beta one asset. To satisfy the second order term, $(x/a)^2$, an short position holding in an asset, to model the negative sign, can be used that varies, or is anticipated to vary, approximately in proportion to the square of the market level.

As can be seen from Equation (5), the coefficient of 2 for the first order term and of ½ for the second order term means that an approximately 4:1 ratio between the beta one and the beta two asset should be sought.

The first and second order terms of Equation (5) are the terms subject to change, or risk, through time. The third, or zero order term, 3/2, can be thought of as cash into purchasing assets or out of selling assets and placed, for example, in an interest-bearing account.

It is to be understood that, if assets or groups of assets could be obtained that are beta three, beta four, and so on, then a simplified Taylor Series including additional terms of higher than second order could be modeled or satisfied. It is also to be understood that, as additional terms in the simplified Taylor series are modeled or satisfied, additional precision could be achieved in prodicing a logarithmic portfolio.

It is also to be understood that, in some embodiments, groups of many different assets can be used in satisfying Taylor Series terms, so long as the group of assets, as a whole, sufficiently approximates the appropriate beta value for the term to be satisfied. In some embodiments, for example, a mutual fund having the appropriate beta value can be used. Specifically, for example, shares in publically owned brokerage firms having a beta value of two can be used in satisfying the second order Taylor Series term, or a mutal fund having shares in different such firms and having a beta value of two could be used. Furthermore, in some embodiments, an exchange fund having an appropriate beta value can be used.

As market level changes through time, however, an initially logarithmic portfolio will grow increasingly not logarithmic. Additionally, as the market level changes, the magnitude of the portfolio and the absolute risk will also change, or drift. As such, to maintain an approximately logarithmic portfolio with an approximately constant absolute risk, adjustments to the asset holdings will occasionally be needed, when the market level changes sufficiently to warrant such adjustment, which can include a net increase or decrease in total holdings, requiring cash input or causing cash output. Herein, such adjusting can be referred to also as re-balancing or resetting.

It can be shown that maintaining approximately constant risk utilizing methods according to the invention can require much less, such as an order of magnitude less, trading than is required to maintain the same approximately constant risk, or an absolute risk with the same deviation from the ideal absolute risk, than by using conventional methods.

Figure 5:
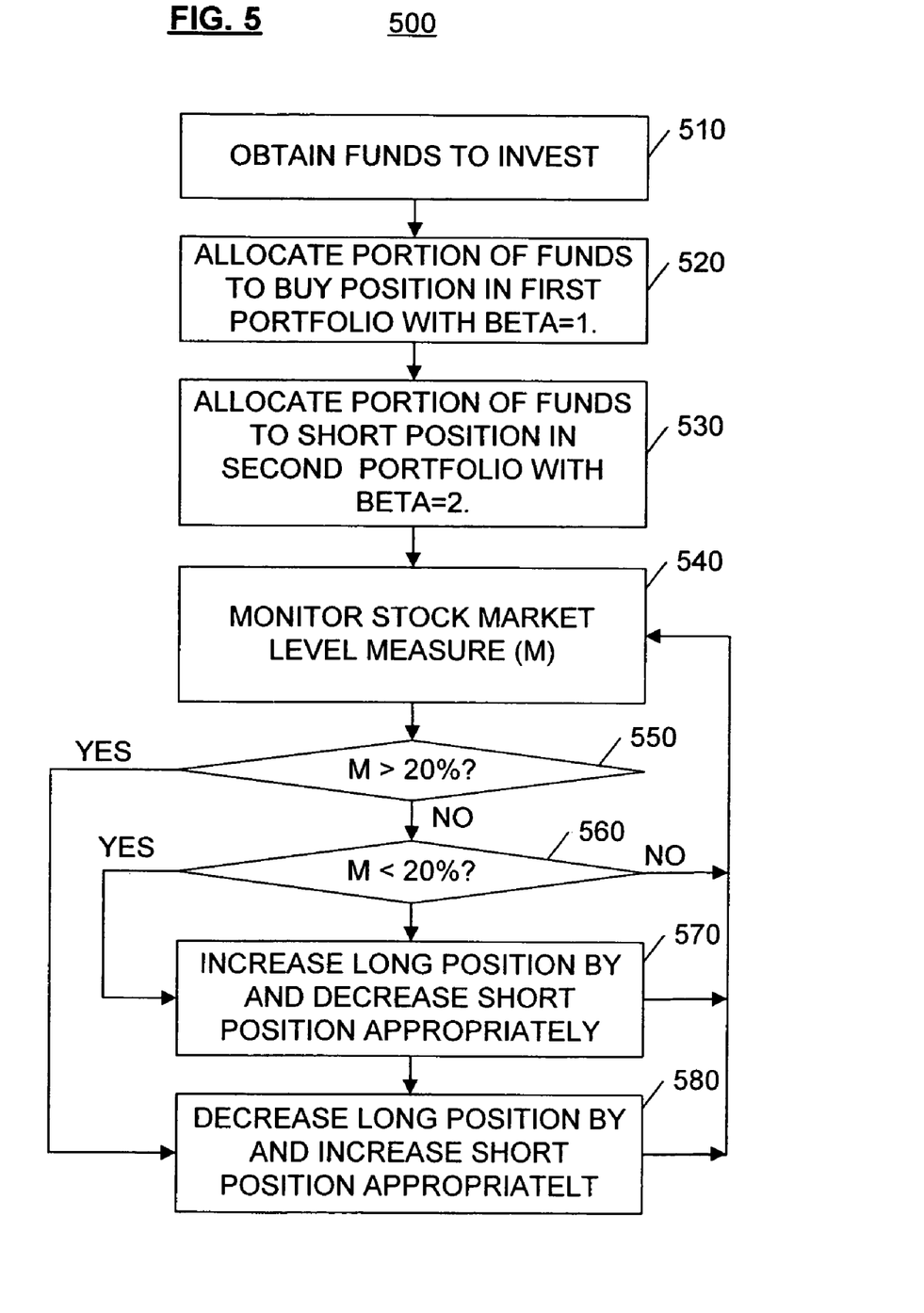
FIG. 5 is a flow diagram depicting a method according to one embodiment of the invention.

FIG. 5 is a flow diagram depicting a method 500 according to one embodiment of the invention. The method can be implemented, for example, using the absolute risk level maintenance program 116 as depicted in FIG. 1.

Initially, at block 510, the investor obtains funds to invest in an approximately logarithmic portfolio with a specified, desired approximate, or exact, absolute risk. Portions of the finds are allocated to a first asset or set of assets that are beta one assets, for example, at block 520, and to a second asset or set of assets that are beta two assets, for example, at block 230.

A stock market level measure (M) is monitored at block 540 to determine whether the market level has increased or decreased by a predetermined "trigger" amount. As one example, a performance measure of approximately 20%, or one standard deviation of the stock market's returns, may be used.

If the measure has increased above the M, at block 550, a rebalancing, or adjusting of asset holdings, is triggered, as necessary to maintain an approximately logarithmic portfolio, and as necessary to maintain the specified approximate, or approximately specified, absolute risk level. In some embodiments, in accordance with a Taylor Series expansion of the natural logarithm function and as described above with reference to FIGS. 1–4, the second percentage may be approximately quadruple the first percentage. At block 560, if the measure has decreased below M, the portfolio is rebalanced by appropriately increasing the long, or buy, position holdings and decreasing the short position holdings. If neither case is true, no rebalancing occurs and monitoring of M continues. In some embodiments, M can be determined using information obtained from the market information database 108 as depicted in FIG. 1.

Note that the technique provided is an example only. Many variations are possible. For example, in some embodiments, third or higher order terms in the Taylor Expansion series are modeled using beta three or higher assets.

Figure 6:
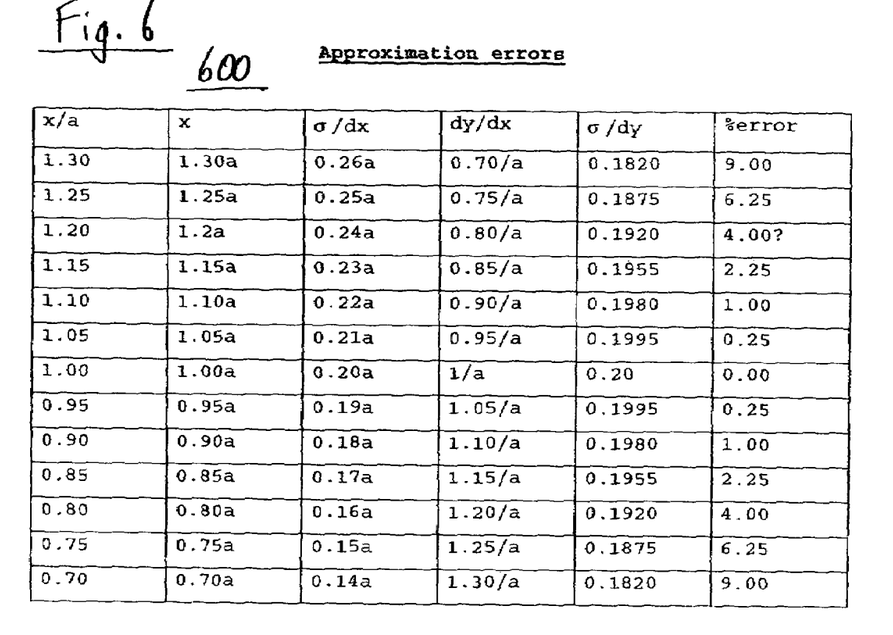
FIG. 6 is a table depicting approximation errors associated with methods according to some embodiments of the invention, indicating maintenance of approximately constant absolute risk.

FIG. 6 is a table 600 depicting approximation errors associated with methods according to some embodiments of the invention, indicating maintenance of approximately constant absolute risk. The table 600 provides a simple numerical demonstration of why methods according to the invention produce approximately constant absolute, or dollar, risk. The risk in the approximation portfolio is the product of two factors: (1) the stock market's dollar risk which, if the risk of its rate of return is constant, rises and falls with the market level; and (2) the sensitivity of the approximation portfolio to stock market changes. In the table 600:

x is the level of the stock market (a is a base market level)
dx is change in the market level
σ dx is one standard deviation of dx (here assumed to be 20 percent of the initial market level)
y is the value of the approximation portfolio
dy is the dollar change in the value
dy/dx is the dollar change in the approximation portfolio that results from a one dollar change in the market level
σ dy is one standard deviation of dy.

The table 600 shows that, although σ dx moves up and down with the market level, the other factor—dy/dx—in the product varies in the opposite direction, with the result that σ dy is almost constant across a range of market levels—from 0.7 to 1.3 times the base level—wide enough to occur infrequently.

Specifically, in Table 600, the first column in the table displays some possible ratios of the ending market level x to the beginning market level a. The second column shows the resulting new market levels. The third column shows the standard deviation of absolute risk based on these new market levels, going forward from the end of the year—assuming that the market's relative risk, the standard deviation of its rate of return is still 20 percent. The fourth column shows the rate of change of the approximation portfolio with respect to change in the stock market level, i.e., dy/dx=1/a (2−x/a). The fifth column is the product of the third and fourth columns, i.e., $T_{dy}=T_{dx}*dy/dx$. Because the third column measures absolute risk in the market level, and the fourth column measures rate of change, the fifth column measures absolute risk in the approximation portfolio.

The absolute risk of the ideal, logarithmic portfolio is 20 percent of the initial market level a, no matter what the subsequent change in market level. But, because the approximation is imperfect, the fifth column shows how its absolute risk drifts progressively farther from the correct, constant value as the new market level x moves away from the beginning market level a. Note that the absolute risk of the approximation portfolio is always less than or equal to the correct value. The sixth column expresses the errors or percentages of the correct absolute risk. For example, for the row of the table for x/a=1.30, there is 0.20−0.1820=0.018, and 0.018/0.20=0.09 or 9%.

It can be seen, for example, that if the constant-risk investor trades back to his initial dollar exposure, i.e., rebalances the portfolio, when the error reaches 4 percent, he will trade roughly one year in three, i.e., when the stock market rises or falls 20 percent, or one standard deviation. See the rows corresponding to x/a=1.20 and 0.80. The rebalancing interval can be adjusted based on the transaction costs. For higher transaction costs, a higher approximation error may be accepted.

The dispersion indicated is the dispersion of next period's absolute, dollar, gain or loss. When the stock market rise or falls 30 percent in the first period, a conventional buy-and-hold investor takes 30 percent, more or less, absolute risk next period. By contrast, the investor in the ideal, logarithmic portfolio takes the same absolute risk in the second period as he took in the first, despite the market's 30 percent change.

As noted, when instead he invests in our approximation portfolio, deferring any trading until the stock market has moved up or down 30 percent, the resulting variation in his absolute risk is limited to his approximation error. FIG. 3 shows that, whereas the dispersion of absolute gain or loss for the ideal logarithmic portfolio has the same 20 percent standard deviation it had before the 30 percent market level change, the standard deviation for our approximation portfolio is only 18.2 percent. Whereas the conventional buy-and-hold investor is experiencing a 30% change in the dispersion of next year's dollar gain or loss, the investor in our approximation portfolio is experiencing a 1.8% change (since 20.0−18.2=1.8), from the constant dispersion of the ideal logarithmic portfolio.

To take a different example, if the constant-absolute-risk investor rebalances his approximation portfolio every time the stock market rises or falls 20 percent (one standard deviation for the U.S. market's relative risk), he will trade roughly one year in three, assuming one-year market returns are roughly normal. His absolute error relative to the ideal logarithmic portfolio is then 0.8 percent or 4 percent of that portfolio's constant 20 percent.

As table 600 shows, the investor using our approximation portfolio can choose from among a wide range of stock market moves for the point that triggers his rebalancing. If the investor has big move before rebalancing, he will trade less often and incur less trading cost. But, his absolute risk dispersions from the constant absolute risk logarithmic portfolio will be bigger.

Figure 7:
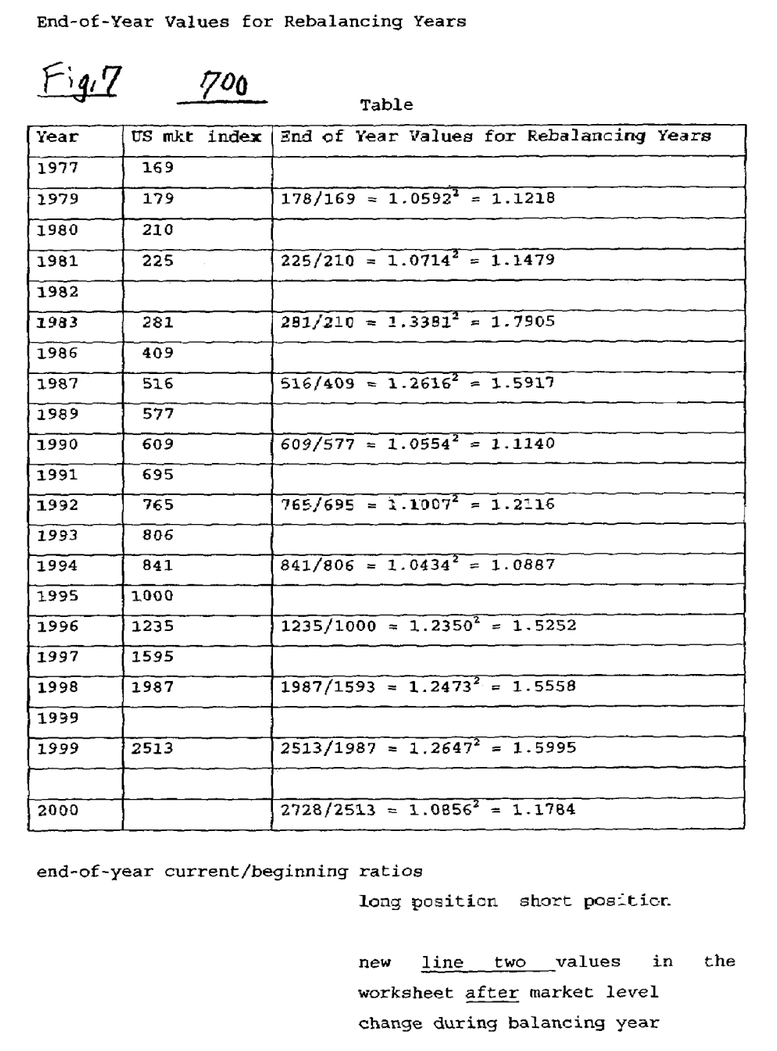
FIG. 7 is a table depicting calculated results of rebalancing over past years according to some embodiments of the invention.

FIG. 7 is a table 700 depicting calculated results of re-balancing over past years according to some embodiments of the invention. In some embodiments, in the approximately logarithmic portfolio, the market values of the risky assets depend on the ratio of the current market level x to what is herein termed the beginning market level. The beginning market level is the market level at which the positions in these assets satisfy the following two constant risk conditions:
1) approximate "exactly" the logarithmic portfolio, with its special quality of producing constant risk;
2) have the desired "scale", or absolute magnitude, corresponding to the desired level of constant risk. (Obviously, different logarithmic portfolios can maintain different constant dollar risks across time.)

When the market level has moved away from the "beginning" level, two things happen:
1) approximation breaks down as 4:1 ratio breaks down
2) scale, or magnitude of net risk, moves away from beginning net risk.

There are many combinations of the two risky positions that will satisfy the 4:1 condition, hence restore the logarithmic character of the portfolio. And there are many combinations that will restore the original net risk. But one, and only one, combination of the two positions can satisfy both conditions-restore the fidelity to the logarithmic ideal and restore the original approximate net risk, or approximate absolute risk. In some embodiments, therefore, Methods are used to find this unique portfolio—to find the unique positions in the two risky assets. Consider the ratio on which the positions' values depend: if one changes the "beginning" market level a in this ratio the current market level x, the ratio reverts to its original value of one. But when the values of the risky positions were based on a ratio value of one, they
1) were in the accurate 4:1 ratio and
2) had the desired level of net dollar risk desired to be maintained over a period of time, for example, an investor's lifetime.

As regards the ratio x/a in the formula for the approximation portfolio:
1) replacing the "beginning" market level with the current level satisfies both conditions, and
2) the dollar values of the two risky positions are completely determined by this ratio.
3) Therefore, these values are the unique values desired.

What these values don't do is provide the same net investment in the two risky positions they had before the ratio was changed back to one. This is where the third, constant, "riskless" term in the Taylor Series formula, or simplified Taylor Series expansion comes in: when the trades are being made in the risky assets dictated by the change in the ratio, these trades absorb or free up cash, which then flows to or from the third, riskless, position. Changes in the value of the riskless position don't change the portfolio's risk, so if, after these trades, the risky positions have the correct risk, so has the portfolio.

As previously discussed, for example, with respect to Equation (5), above, some embodiments use a simplified Taylor Series expansion in adjusting, or re-balancing a portfolio. The following discussion provides some additional detail in accordance therewith, and used data from Table 700 of FIG. 7.

When the ratio $$\frac{x}{a}$$

equals one, the net value of the two risk positions is $$1000\left[2(1) - \frac{1}{2}(1^2)\right] = 1000\left(\frac{3}{2}\right) = 1500.$$

When the $\frac{x}{a}$ equals $\frac{210}{169}$ 210/169 the net value is $$1000\left[2(1.243) - \frac{1}{2}(1.243)^2\right] = 2,485 - 0,771 = 1714.$$

So rebalancing back to x/a equals 169/169 reduces the net value by

1714−1500=214.

This is the amount of cash that is to be transferred to the riskless asset in order to preserve the value of the (3 positions: 2 risky and 1 riskless) total portfolio when rebalanced from a ratio value of 210/169 back to 169/169. (Or, equivalently, to 210/210.)

For the 22-year US work sheet provided by FIG. 7, there are three lines for each year: Line 1 reflects change in the market level since the last rebalancing; until rebalancing, the ratio (current market/beginning market) changes every year. After balancing the ratio goes back to one, but then it changes during that year. The ratios shown are the end-of-year ratios.

Line 2 is the year-end value of the two risky positions based on the Line 1 ratio and its square; it's the change in this value that must be allowed for at rebalancing.

Line 3 is the value of the whole portfolio including the cumulative effects of cash flowing in and out of the riskless position.

The following discussion provides additional detail regarding some aspects of some embodiments the invention as described above and underlying conceptual basis. Investors can increase their expected returns if they are willing to bear more risk, or they can bear less risk if they are willing to accept a lower return. So, anything that reduces risk without reducing expected return, such as diversification, is valuable. For example, if two or more risky assets have the same expected return, then a portfolio containing both will have the same expected return, no matter what the relative weights accorded the assets. But, the portfolio's risk—the dispersion of the portfolio's risky outcomes—depends on the weights. For example, in a portfolio of 100 stocks with equal but uncorrelated risks, the standard deviation of the portfolio's risk is $1/\sqrt{100}=1/10$, or one-tenth the standard deviation of the individual stocks. Actual portfolios are much riskier because the risks in actual stocks are highly correlated, i.e., they often go up or down together.

For most investors, the purpose of investing is to have a large nest egg or "terminal wealth" when they reach retirement. If they borrow, they can own more risky assets and increase the expected rewards to risk taking, hence their expected terminal wealth. But, borrowing also increases the risk. There is, however, a useful analogy between the risk-reward problem for individual years and the risk-reward problem for the portfolio value at retirement. For individual years, the end portfolio value is the approximate, weighted, algebraic sum of the ending values for the stock. At retirement, the terminal wealth is the approximate, weighted, algebraic sum of the gains and losses from the individual years.

There is one important flaw in the analogy—whereas, within any year, stocks tend to go up and down together, years don't tend to go up and down together. If they did, a current year's performance could be reliably predicted from a previous year's. So, the square root law, which is too optimistic for the standard deviation of a conventional, one-year stock portfolio, holds almost exactly for a terminal wealth portfolio of the gains and losses from the individual years. For example, for a 49-year investment career, one has for the reduction in standard deviation $1/\sqrt{49}=1/7$. But, the investor gets this reduction in risk only if he takes the same absolute risk in each year. For example, if the market doubles in the current year, the absolute risk in the next year is twice that of the current year. To get back to the initial risk level, the investor has to do a lot of buying and selling, which results in transaction costs. This problem is significant since large moves in the market are common. For example, one year in three, on average, the U.S. stock market rises or falls more than 20%. This is the standard deviation of the market's returns. A corresponding value can be derived for the markets of foreign countries.

The investment technique of the invention addresses this problem by constructing a portfolio of real stocks that tends to maintain constant absolute risk when the market level, and hence the value of conventional stock portfolios, fluctuates. A theoretical portfolio is derived that maintains constant risk exactly, then a practical approximation to the theoretical portfolio is provided. Some trading is still required since the approximation drifts away from the theoretical ideal when the market level changes too much, but experiments with the U.S. market suggest that the technique significantly cuts the amount of trading.

Modem finance treats investment risk as something that can be quantified. In particular, the unknown future value of a risky asset such as a stock can be described by a probability distribution such as standard deviation, which is a measure of dispersion. When there is a normal distribution, the risky outcome will be less than one standard deviation above or below the mean 68% of the time. This familiar measure of dispersion is helpful in some cases but does not work with a probability distribution that has a high skewness, i.e., where one of the tails of the probability distribution is longer than the other. Many investment risks are represented by such a skewed probability distribution.

For the conventional constant risk investor, change in absolute risk is proportional to the change in market level that can be tolerated before trading back to the original position. A measure of the dispersion of possible market level changes is the standard deviation. Assuming a Normal distribution of level changes over short trading intervals, the annual change will exceed 20 percent roughly 34 times in 100 for the U.S. market.

Under constant absolute risk, the probability distribution of terminal wealth is normal, with a dispersion completely described by the distribution's standard deviation. And that standard deviation depends only on the standard deviation for absolute (dollar) gain or loss in the individual years of the investor's career.

If an investor were so fortunate as to be able to choose any, say, fifty risky stocks with no correlation in their surprises and the same risks and expected rewards, he would give each stock the same weight in his portfolio. But his terminal wealth can be viewed as a portfolio of his investment outcomes in each of, say, fifty years of his investment career. And the evidence is that the relative risk—the dispersion of the one-year rates of return—is constant across time.

The technique is based on certain assumptions about real stock markets:

1. Relative Risk—the dispersion of rate or return (change in value, divided by beginning value) is constant across time.
2. Market surprises in non-overlapping time periods are uncorrelated.
3. Measurement services report a wide mutually continuous range of measured beta. There are economic bases for at least two of these values—one and two.
4. If consideration #1 holds, then a portfolio where value varies as the logarithm of the market level will have constant absolute risk. That is, the dispersion of the changes in its absolute, dollar, value will be constant for all periods of equal length. A proof of this available from the inventor on request.
5. For simplicity, we've assumed that real riskless rate of return is zero. For a discussion of the evidence, see The Millennium Book, A Century of Investment Returns, P Marsh and M. Staunton.

An investor who buys into the market at the beginning of his career and holds until the end will experience the same relative risk in every year. The value of his terminal wealth will be the product of the market's gains and losses (measured as one plus the rate of return) in the individual years. As a result, even if the distribution of market surprises over short periods is almost symmetric, the distribution of his terminal wealth will be severely skewed to the right.

Contrast this reset with constant absolute risk, where the gains and losses from individual years, add, rather than multiply. If the absolute gains and losses for each year: 1) have the same dispersion; and 2) are mutually uncorrelated, then one has a classic example of the Central Limit Theorem: terminal wealth will be mutual only free of skewness, but actually normal—whether the one-year distributions are strictly normal or not.

But if the market's relative risk is constant over time, then its absolute risk is proportional to the market level. An investor who lets market fluctuations determine how much he invests will have a high level of absolute risk when the market is high and a low level of absolute risk when the market is low. In terms of their impact on his terminal wealth, the conventional investor is making big bets on some years and small bets on others and, we're still linking his bets to investment outcomes in prior years—foregoing in so doing the extraordinary benefits of time diversification. But suppose that, instead of letting the ending value of last year's portfolio determine the beginning value of this year's portfolio, the investor makes whatever trades are necessary to incur the same absolute risk in each year. This is what the present invention achieves.

If the constant-absolute-risk investor were able to hold a portfolio where value varies with the logarithm of the market level, he would never need to trade. So, his risk variations when he holds the approximation portfolio are limited to its approximation errors.

Our approximation to the logarithmic function is:

$$\ln(x/a) \cong y(x/a) = 2(x/a) - (\tfrac{1}{2})(x/a)^2 - \tfrac{3}{2}.$$

"a" is the initial stock market level, and "x" is the uncertain future level. It is easy to show that, for small market level changes, e.g., for x/a close to one, this expression is an excellent approximation to $\log_e(x/a) = \ln(x/a)$. Any value for the constant term will produce the same risk. So, the investor, who cares nothing about approximating the logarithmic function and everything about its incidental property of constant absolute risk, can borrow and lend freely without regard for the effect on the constant term. What the investor should not do is violate the condition that 0.7<x/a<1.3, or let the value of the coefficients of the two risky terms change. When the investor rebalances, the current market level x becomes the new base level "a". But, the investor will need to shift assets among the three terms to preserve his original coefficients for the two risky terms. What matters most for these two coefficients is their real value, net of accumulated trading costs.

Thus, one can approximate the logarithmic portfolio with a first portfolio involving a long, e.g., buy, position in one risky asset and a second portfolio involving a short position in another risky asset. The long position is based on the factor +2(x/a), while the short position is based on the factor $-(\tfrac{1}{2})(x/a)^2$. Additionally, since the power of x is one in +2(x/a), a beta=1 is used for the first portfolio, and since the power of x is two in $-(\tfrac{1}{2})(x/a)^2$, a beta=2 is used for the second portfolio. Moreover, the proportion of funds allocated to the first and second portfolios may be 2:½ or 4:1.

Theoretically, additional higher-order terms in the above logarithmic approximation or expansion series could be used, e.g., orders 3, 4, . . . , but in practice, stocks having betas above two are generally not available.

Let a (the beginning market level) equal to one and take the derivative with respect to the new market level x.

So that:

1/x≅dy/dx=2−x.

When the market level has moved 20 percent (to 1.2):

1/1.2≅dy/dx=2−1.2.

Compare the risks:

(exact) 0.833 vs. 0.8 (approximation).

The approximation error is:

0.833−0.800=0.033, or 3.3%.

Now consider the change in risk if, instead, the investor simply takes a long, e.g., buy, position in the U.S. Stock Market. How short would the conventional investor's trading interval have to be to reduce the standard deviation of his dollar outcomes from 20 percent to 3.3 percent? For a randomly fluctuating market, the standard deviation varies with the square root of the length of the interval x between trades. If x is measured in weeks, with 52 weeks in a year, then it satisfies:

√(x/52)=3.3/20=0.165;

x/52=0.0272; and x=1.4 weeks.

Such a short trade interval would be undesirable due to transactions and management costs.

Generally, according to the invention, a rebalancing is triggered much less frequently, when the performance measure of the stock exceeds or falls below a standard deviation, e.g., +/−20%. For example, assume a market level at the start of the investment of 169, and at the end of years 1, 2 and 3 of 179, 210 and 225, respectively. The market level return at the end of year 1 is 179/169=1.059 (up 5.9%). The market level return at the end of year 2 is 210/169=1.243 (up 24.3%). A rebalancing is triggered at this time. The market level return at the end of year 3 is 225/210=1.071 (up 7.1%). Thus, in one approach, the change in the performance measure is based on the increase relative to the most recent rebalancing time. However, flexibility may be employed in following this rule such that rebalancing occurs more or less often. For example, rebalancing may occur at different times in a year and not necessarily at a predetermined time each year, such as at the year end.

Regarding inflation, relative risk, or the dispersion of rate of return, is the risk of a ratio of two nominal properties. Rate of return is the ratio of the change in an asset's value over a time interval to its beginning value. The risk in an asset's rate of return is in the numerator of this ratio—from the "absolute" risk surrounding the change in value over the next interval. Its "relative" risk is the absolute risk, divided by the asset's beginning value.

Inflation affects this ratio by algebraically adding to (nominal) market level changes measured in minimal dollars, increasing the positive changes and decreasing the negative changes, but doesn't change the normal distance between them. So, inflation doesn't significantly affect measures of dispersion, except to determine the nominal units in which both are measured. Dispersion is affected only by changes in the inflation rate, which are an order of magnitude smaller than market level changes. On the other hand, both the numerator and denominator of the ratio are measured in the same nominal dollars. This may be only the stock market's relative risk—the dispersion of the rate of return ratio—has been remarkably stable through periods of both high and low inflation.

Here's why our approximation method works. Make the standard academic assumption that relative risk for the U.S. stock market is roughly constant. Let:

| | |
|---|---|
| a = | beginning market level |
| x = | market level at end of year |
| dx = | change in market level |
| $T_{dx}$ = | standard deviation of change |
| y = | value of approximation portfolio |
| dy = | change in value of approximation |
| $T_{dy}$ = | standard deviation of change |

Bearing in mind that market level after one year is x, the absolute end-of-year risks in the approximation portfolio value y satisfy:

$$dy/dx = (1/a)(2-x/a).$$

But if, for example, the beginning market level is a, and over the year, the level rises 10 percent, the market level at the end is 1.10a, in which case the new standard deviation for absolute change over the next year is 1.1 times 20 percent, or 22 percent of the initial market level a.

It has been shown that a portfolio where value varies with the logarithm of the market level will have constant absolute risk if the market level itself has constant relative risk. This means that, for time intervals of equal length, the dispersion of absolute gain or loss will be the same. The logarithmic portfolio can be approximated with one involving a long, or buy, position in one risky asset and a short position in another. The accuracy of our approximation depends on maintaining the correct proportion between these positions. For example, when the market level goes up, the absolute value of both positions increases. So, even if the investor initially holds the correct proportions, they won't be correct after the market level changes. Fortunately, for market level changes up to about +/−30%, the risk in the approximation is still close to the ideal. But, whenever the market change threatens to exceed this limit, it is necessary to rebalance the two positions.

Let t be the time at which a rebalancing back to the correct proportions takes place. Denote the beginning and end of the investor's investment career by t=0 and t=T, respectively, and denote the market level at time t by $x_t$. Then:

$$x_t/x_o = x_1/x_o \cdot x_2/x_1 \cdot \ldots \cdot x_t/x_{t-1}$$

Taking logarithms gives:

$$\ln x_t/x_o = \ln x_1/x_o + \ln x_2/x_1 + \ldots + \ln x_t/x_{t-1}$$

where the right hand terms correspond to time intervals between rebalancing.

Our approximation for those individual terms will be reasonably accurate if rebalancing is done before $x_t$ changes enough to violate $0.7 < x_t/x_{t-1} < 1.3$, i.e., when the performance measure decreases or increases by 30%.

In some embodiments, rebalancing intervals do not have to be equal. They can range from days or less to years, depending on what the market does. Furthermore, periods between rebalancing do not have to be equal in time. In addition, in some embodiments, re-balancing, or adjustment of asset holdings, can be done according to some other trigger or other factors than a fractional market level change. In some embodiments rebalancing can be done whenever it is desired to remedy drift away from a logarithmic portfolio or away from a desired level of absolute risk, as can occur, for example, through time and changing market levels.

It is the logarithmic function that is to be approximated, interval by interval, which assures roughly equal risk in equal time periods. If the market level rises, the approximation errors for the rebalancing intervals will not balance out. So, the terminal value of the logarithmic portfolio is not necessarily duplicated—only its risk.

Accordingly, it can be seen that the present invention provides an investment technique that optimizes the return of funds invested in a stock market while maintaining an approximately constant absolute risk of the invested funds, and avoiding costs that would otherwise be incurred by frequent trading.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention. For example, while numerical examples were provided with a view to the U.S. stock market, the principles of the invention apply equally to the markets of other countries.

What is claimed is:

1. A computerized method for investing in a stock market, comprising:
    allocating funds to be invested among at least: a first portfolio wherein a long position is taken and a second portfolio wherein a short position is taken, wherein the long position has a ratio of its rate of return to the rate of return of the stock market of approximately 1, wherein the short position has a ratio of its rate of return to the rate of return of the stock market of approximately 2, and wherein the long position is approximately 4 times the short position;
    determining when successive rebalancing times are indicated by tracking a measure of a level of the stock market; and
    using one or more computers, in response to the tracking, adjusting fund amounts allocated to the first and second portfolios at the successive rebalancing times thereby maintaining an approximately constant absolute risk in connection with the portfolios.

2. The method of claim 1, wherein:
    allocating funds to be invested in at least a first portfolio and a second portfolio comprises allocating funds to be invested in a first portfolio that has a risk measure that indicates its performance substantially tracks the measure and allocating funds in a second portfolio that has a risk measure that is substantially greater than the risk measure of the first portfolio.

3. The method of claim 1, comprising:
    tracking a buy position in the first portfolio and a short position in the second portfolio.

4. The method of claim 1, comprising:
    in response to tracking a measure of a level of the stock market to determine when successive rebalancing times are indicated, determining that successive rebalancing times are indicated when a current value of the measure has changed relative to a previous value thereof by a trigger percentage level;
    and wherein adjusting comprises:
    (a) decreasing the funds allocated to the first portfolio, and increasing the funds allocated to the second portfolio, when a value of the measure at a first rebalancing time has increased relative to a previous value thereof; and
    (b) increasing the funds allocated to the first portfolio, and decreasing the funds allocated to the second portfolio, when the value of the measure at the first rebalancing time has decreased relative to the previous value.

5. The method of claim 4, wherein adjusting comprises:
    when the value of the measure at the first rebalancing time has increased relative to the previous value, decreasing the funds allocated to the first portfolio to a first percentage and decreasing the funds allocated to the second portfolio to approximately four times the first percentage.

6. The method of claim 5, wherein adjusting comprises:
    when the value of the measure has decreased relative to the previous value, increasing the funds allocated to the first portfolio to a first percentage and increasing the funds allocated to the second portfolio to approximately four times the first percentage.

7. The method of claim 1, wherein allocating funds to be invested among at least a first portfolio wherein a buy position is taken and a second portfolio wherein a short position is taken comprises allocating funds to at least a third fund comprising an asset with a beta of three.

8. The method of claim 1, wherein tracking comprises:
    determining that successive rebalancing times are indicated when a current value of the measure has changed relative to a previous value thereof by a trigger percentage level.

9. The method of claim 8, comprising:
    determining the trigger percentage level based on a standard deviation of a rate of return associated with the measure.

10. The method of claim 9, wherein:
the trigger percentage level is approximately 20–30% of the previous value of the measure.

11. The method of claim 10, wherein:
the trigger percentage level is approximately 20% of the previous value of the measure.

12. A computer program product or products for assisting in investing in a stock market, comprising a computer usable medium or media having computer readable code embodied therein, the computer readable code when executed causing one or more computers to perform a computerized method comprising:

allocate funds to be invested among at least: a first portfolio wherein a long position is taken and a second portfolio wherein a short position is taken, wherein the long position has a ratio of its rate of return to the rate of return of the stock market of approximately 1, wherein the short position has a ratio of its rate of return to the rate of return of the stock market of approximately 2, and wherein the long position is approximately 4 times the short position;

determining when successive rebalancing times are indicated by tracking a measure of a level of the stock market; and using at least one of the one or more computers to, in response to the tracking, adjust fund amounts allocated to the first and second portfolios at the successive rebalancing times thereby maintaining an approximately constant absolute risk in connection with the portfolios.

* * * * *

UNITED STATES PATENT AND TRADEMARK OFFICE
CERTIFICATE OF CORRECTION

PATENT NO. : 7,143,061 B2
APPLICATION NO. : 10/389667
DATED : November 28, 2006
INVENTOR(S) : Jack Treynor It is certified that error appears in the above-identified patent and that said Letters Patent is hereby corrected as shown below:

1. Figure 5, Sheet 5, which also appears on the front page of the patent, in the bottom box, where it says "APPROPRIATELT" should be replaed with --APPROPRIATELY--
2. Column 8, Equation #4, the portion of the formula that reads "log x/a=~" should read --log (x/a) ≈--
3. Column 8, equation #5, the portion of the formula that reads "log (x/a)=~2" should read --log x/a ≈2--
4. Column 14, line 3, "34" should be --32--
5. Column 14, line 48: "reset" should be --result--
6. Column 14, line 53: "mutual" should be --not--
7. Column 16, line 36: "only" should be --why--

Signed and Sealed this

First Day of May, 2007

JON W. DUDAS
*Director of the United States Patent and Trademark Office*